J. S. Hoar,

Bench Vise.

No. 2,606. Reissued May 14, 1867.

Witnesses
G. H. Washburn
Samuel N. Piper

Inventor
John S. Hoar
By his attorney
R. H. Eddy

N. PETERS, PHOTO-LITHOGRAPHER, WASHINGTON, D. C.

United States Patent Office.

JOHN S. HOAR, OF WEST ACTON, MASSACHUSETTS.

*Letters Patent No.* 55,656, *dated June* 19, 1866; *reissue No.* 2,606, *dated May* 14, 1867.

IMPROVED VISE.

The Schedule referred to in these Letters Patent and making part of the same.

TO ALL PERSONS TO WHOM THESE PRESENTS SHALL COME:

Be it known that I, JOHN S. HOAR, of West Acton, in the county of Middlesex, and State of Massachusetts, have invented an improved Bench-Vise; and do hereby declare the same to be fully described in the following specification, and represented in the accompanying drawings, of which—

Figure 1:
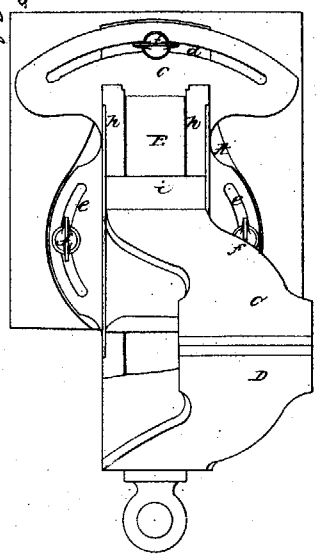

Figure 1 is a top view.

Figure 2:
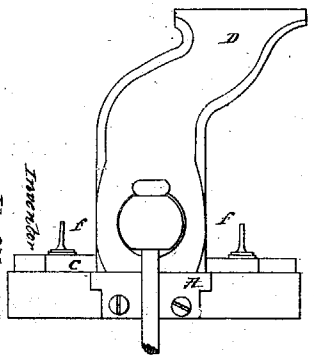

Figure 2, a front elevation.

Figure 3:
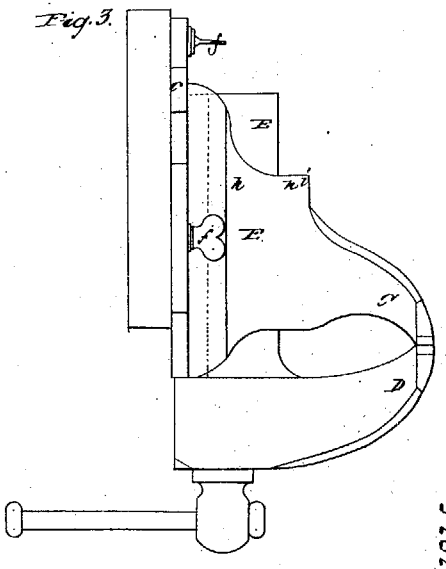

Figure 3, a side elevation; and

Figure 4:
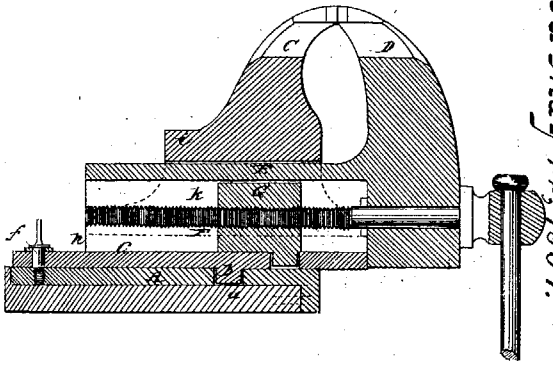

Figure 4, a vertical and longitudinal section of it.

In the said drawings, A denotes the bed-plate for supporting the vise. This bed-plate is intended to be let into and screwed down to a bench top, and it is to have a pivot-hole, *a*, made through it, the said hole being to receive a pivot, *b*, to project down from the bottom plate of the stationary jaw-carrier B of the vise. The bottom part of such jaw-carrier B is a flat plate, *c*, provided with three slots arranged in it as shown at *d e e*, each of which is curved to the arc of a circle, having its centre in the axis of the pivot *b*. There is a set-screw, *f*, to each slot, the screw going down through the slot and being screwed into the support-plate, A. From the plate *c* guide-plates *h h* rise upward parallel to each other, the stationary jaw C being supported by a cap, *i*, which extends from one guide-plate to the other. The jaw C, the cap *i*, the guide-plates *h h*, and the plate *c* are to be cast in one piece of metal. The shank E of the movable jaw D is grooved lengthwise as shown at *k*, in order to receive the screw F and the standard G, employed for giving motion to the movable jaw. Such standard extends up from the plate C and has the screw F screwed through it. The screw should be so applied to the movable jaw shank as to be stationary relatively thereto, except in being capable of being revolved so as to effect the movements of the shank such as to cause the movable jaw either to approach or recede from the stationary jaw. The arrangement of the jaws is such as to cause their middles to extend beyond a vertical line passing through one side of the jaw shank E, or, in other words, each jaw is arranged so as to extend nearly if not entirely beyond such line. The object of this arrangement of the jaws is to enable any long article, when projecting below them, to be held by them without interference from the shank, such article extending down by the side of the shank, my said arrangement affording more scope to the use of the vise, than exists when the jaws are arranged in the ordinary manner with respect to their carriers, that is so that each jaw shall have its middle directly over the axis of its carrier or shank. By constructing the stationary jaw-carrier with the three slots arranged in it as specified, the back slot and its screw will serve not only to afford greater stability to the whole vise, but to prevent the metal at the side or shorter slots from being broken while the vise may be in use.

I do not claim the single back slot *d* and its clamp-screw *f*, in connection with a frame provided with a pivot and to turn on another frame or bed-plate, as this is common to many machines. I employ the back slot and its clamp-screw for the purpose above specified, and the side slots and their clamp-screws to counteract the lateral strain tending to twist the jaw-carriers, and break them under blows on any article when held by the jaws, when extended wholly or nearly so on one side of the shank of the stationary jaw as specified. My invention is a very important improvement on the rotary bench-vise, it rendering it very strong and useful for many purposes for which ordinary rotary bench-vises cannot well be employed.

What I claim as a special improvement in bench-vises of the kind described, or those to turn horizontally on a bed-plate, is the combination of all the several parts of the vise, when constructed and arranged substantially as herein described.

I also claim the particular shape herein shown and described of the jaws of the vise, such causing them to be eccentric with respect to the shank E.

JOHN S. HOAR.

Witnesses:

O. H. WOODARD,

CHAS. HASTINGS.